US008424839B2

(12) United States Patent
Hayashi et al.

(10) Patent No.: US 8,424,839 B2
(45) Date of Patent: Apr. 23, 2013

(54) DIRECT-CURRENT MOTOR CONTROL DEVICE AND METHOD FOR DETECTING STATE OF DIRECT-CURRENT MOTOR

(75) Inventors: Hideki Hayashi, Kariya (JP); Satoru Hiramoto, Chita (JP)

(73) Assignee: Denso Corporation, Kariya (JP)

( * ) Notice: Subject to any disclaimer, the term of this patent is extended or adjusted under 35 U.S.C. 154(b) by 296 days.

(21) Appl. No.: 13/020,207

(22) Filed: Feb. 3, 2011

(65) Prior Publication Data
US 2011/0198521 A1    Aug. 18, 2011

(30) Foreign Application Priority Data

Feb. 18, 2010  (JP) ................................ 2010-033690

(51) Int. Cl.
*F16K 31/02*    (2006.01)
(52) U.S. Cl.
USPC ..................... 251/129.13; 310/68 B; 310/179
(58) Field of Classification Search ............. 251/129.13; 310/12.22, 68 B, 216.012, 179–194
See application file for complete search history.

(56) References Cited

U.S. PATENT DOCUMENTS

| | | | | |
|---|---|---|---|---|
| 3,085,170 | A * | 4/1963 | Brown ............................ | 310/95 |
| 5,574,342 | A * | 11/1996 | Okamoto ................. | 318/400.41 |
| 6,401,689 | B1 | 6/2002 | Ito et al. | |
| 6,903,480 | B2 * | 6/2005 | Yamamoto et al. ..... | 310/216.012 |
| 7,304,446 | B2 * | 12/2007 | Wang et al. ................. | 318/254.1 |
| 7,312,545 | B2 * | 12/2007 | Sasaki et al. ................ | 310/68 R |
| 7,339,301 | B2 * | 3/2008 | Chen et al. ............. | 310/216.012 |
| 7,938,382 | B2 * | 5/2011 | Huerta-Ochoa et al. . | 251/129.13 |
| 8,222,776 | B2 * | 7/2012 | Tanaka et al. ................ | 310/67 R |
| 2004/0124737 | A1 * | 7/2004 | Yamamoto et al. ........... | 310/269 |
| 2005/0285471 | A1 * | 12/2005 | Chen et al. ..................... | 310/216 |
| 2009/0164098 | A1 | 6/2009 | Uda | |
| 2010/0033064 | A1 | 2/2010 | Tanaka et al. | |
| 2011/0148258 | A1 | 6/2011 | Tanaka et al. | |

FOREIGN PATENT DOCUMENTS

| | | |
|---|---|---|
| GB | 2 391 118 | 1/2004 |
| JP | 58-133197 | 8/1983 |
| JP | 10-225035 | 8/1998 |
| JP | P2001-73816 A | 3/2001 |
| JP | P2001-103712 A | 4/2001 |
| JP | P2003-319629 A | 11/2003 |
| JP | P2004-270563 A | 9/2004 |

(Continued)

OTHER PUBLICATIONS

U.S. Appl. No. 12/898,933, Toshiaki Uda, filed Oct. 6, 2010.

(Continued)

*Primary Examiner* — John K Fristoe, Jr.
*Assistant Examiner* — Matthew W Jellett
(74) *Attorney, Agent, or Firm* — Nixon & Vanderhye P.C.

(57) ABSTRACT

A current detection unit detects an electric current caused by superimposing a direct current from a direct-current power source on an alternating current from an alternating-current power source and supplied through a brush to a direct-current motor. An extracting unit extracts an alternating-current component of the detected electric current. An angle detection unit detects a rotation angle of the motor according to the extracted alternating-current component. A direction detection unit detects a rotative direction of the motor according to a change pattern of the extracted alternating-current component. A core of the motor has slots each defined between adjacent two of teeth. The slots respectively accommodate phase coils respectively wound around the teeth. Turns of the phase coils are different from each other.

9 Claims, 11 Drawing Sheets

FOREIGN PATENT DOCUMENTS

| | | |
|---|---|---|
| JP | 2007-006560 | 1/2007 |
| JP | 2008-203112 | 9/2008 |
| JP | P2009-150328 A | 7/2009 |
| JP | P2011-130582 A | 6/2011 |

OTHER PUBLICATIONS

Japanese Office Action dated Nov. 22, 2011, issued in corresponding Japanese Application No. 2010-033690 with English Translation.

* cited by examiner

DIRECT-CURRENT MOTOR CONTROL DEVICE AND METHOD FOR DETECTING STATE OF DIRECT-CURRENT MOTOR

CROSS REFERENCE TO RELATED APPLICATIONS

This application is based on and claims priority to Japanese Patent Application No. 2010-33690 filed on Feb. 18, 2010, the contents of which are incorporated in their entirely herein by reference.

FIELD OF THE INVENTION

The present invention relates to a direct-current motor control device including a rotation angle detection device configured to detect the rotation angle and the rotative direction of a direct-current motor with a brush. The present invention further relates to a method for detecting a state of the direct-current motor.

BACKGROUND OF THE INVENTION

For example, JP-A-2007-6560 discloses a conventional rotation angle detection device configured to detect the rotation angle of a brushed direct-current motor. Such a brushed direct-current motor includes a rotor including a stator, which has multiple magnetic poles, and an armature winding accommodated in multiple slots, a commutator connected with the armature winding, and a pair of brushes for supplying electricity from an external power source to the armature winding. The commutator is mounted on an end of a shaft of the direct-current motor for detection of the rotation angle. Electric conduction among the two brushes and the commutator is repeatedly made and removed with rotation of the shaft to cause pulse signals. The rotation angle detection device counts the pulse signals thereby to detect the rotation angle of the direct-current motor.

In the rotation angle detection device disclosed in JP-A-2007-6560, an end of the shaft of the direct-current motor is equipped with a sensor separately from the stator and the rotor. Therefore, the rotation angle detection device may be enlarged. In addition, the rotation angle detection device cannot detect the rotative direction of the motor. Therefore, when, for example, an external force is applied to the direct-current motor to rotate the direct-current motor in the right of reverse direction, it is hard to detect the rotation angle of the direct-current motor correctly.

SUMMARY OF THE INVENTION

In view of the foregoing and other problems, it is an object of the present invention to produce a direct-current motor control device configured to detect the rotation angle and the rotative direction of a direct-current motor steadily. It is another object of the present invention to produce a method for detecting a state of the direct-current motor.

FIGS. 10A to 12B show an example of a rotation angle detection device disclosed in Japanese patent application 2008-203112. The rotation angle detection device shown in FIGS. 10A to 12B has a downsized body configured to detect the rotation angle of a direct-current motor correctly.

The rotation angle detection device (first and second related arts) is configured to detect the rotation angle of the direct-current motor. The rotation angle detection device includes a direct-current power source 101, an alternating-current power source 102, a coupling capacitor 103, a current detection unit 104, a signal processing unit 105, and a rotation angle detection unit 106. The direct-current power source 101 generates a direct current. The alternating-current power source 102 generates an alternating current. The coupling capacitor 103 superimposes the alternating current generated by the alternating-current power source 102 on the direct current supplied from the direct-current power source 101 to the direct-current motor and supplies the superimposed alternating and direct currents. The current detection unit 104 detects an electric current flowing through the direct-current motor. The signal processing unit 105 performs various signal processings according to the electric current detected by the current detection unit 104 and generates a rotation pulse signals. The rotation angle detection unit 106 detects the rotation angle of the direct-current motor according to the rotation pulse signals outputted from the signal processing unit 105.

The direct-current motor includes an armature core, an armature winding, a commutator, and a pair of brushes 114, 115. The armature core includes three teeth. The armature winding includes three phase coils L1 to L3 respectively wound around the circumferences of the teeth. The commutator includes three segments 111 to 113 connected with the armature winding. The pair of brushes 114, 115 is opposed to each other. The numbers of turns of the phase coils L1 to L3 are the same. Therefore, the inductances of the phase coils L1 to L3 have the same value (L1=L2 L3). Two of the three segments 111 to 113 are respectively in contact with the brushes 114, 115. The commutator rotates with rotation of the direct-current motor. Two segments, which are respectively in contact with the brushes 114, 115, are switched with rotation of the commutator.

In the rotation angle detection device (first related art) shown in FIG. 10A, a capacitor C1 is connected in parallel with the phase coil L1 in the direct-current motor. As shown in FIG. 12A, one end of the shaft of the direct-current motor is equipped with a ring varistor 120. The ring varistor 120 is formed with three electrodes 121 to 123. The capacitor C1 is provided in a boundary between the electrode 121 and the electrode 122. The capacitor C1 is soldered and fixed to the electrodes 121, 122 of the ring varistor 120.

The rotation angle detection device (first related art) forms two kinds of electric circuits having different impedances each time when the direct-current motor rotates by 60 degrees or 120 degrees. As shown in the state between times T1 and T4 in FIG. 10B, the current detection unit 104 detects two kinds of pulsation electricity forms different from each other in amplitude caused by an electric current flowing into the electric circuits. The signal processing unit 105 converts a change in amplitude of the electric current detected by the current detection unit 104 into two steps of pulse signals having different voltages. The rotation angle detection unit 106 counts the number of times by which the state of the pulse signals changes in a predetermined period. Thereby, the rotation angle detection unit 106 detects the rotation angle of the direct-current motor. In the present structure, the rotation angle detection device (first related art) is capable of detecting the rotation angle of the direct-current motor for each 60-degree rotation or 120-degree rotation.

In the rotation angle detection device (second related art) shown in FIG. 11A, capacitors C1, C2 are respectively connected in parallel with phase coils L1, L2 in the direct-current motor. The capacitance of the capacitor C2 is smaller than the capacitance of the capacitor C1. As shown in FIG. 12B, the capacitor C1 is provided in a boundary between the electrode 121 and the electrode 122 of the ring varistor 120. The capacitor C2 is provided in a boundary between the electrode 122 and the electrode 123 of the ring varistor 120. The capacitors C1, C2 are respectively soldered and fixed to the electrodes 121 to 123 of the ring varistor 120.

The rotation angle detection device (second related art) forms three kinds of electric circuits having different impedances each time when the direct-current motor rotates by 60 degrees. As shown in the state between times T1 and T4 in FIG. 11B, the current detection unit 104 detects three kinds of pulsation electricity forms different from each other in amplitude caused by an electric current flowing into the electric circuits. The signal processing unit 105 converts a change in amplitude of the electric current detected by the current detection unit 104 into three steps of pulse signals having different voltages. The rotation angle detection unit 106 detects that the direct-current motor rotates in a normal direction when the pulse signals (X) outputted from the signal processing unit 105 change in the order of the first status (high-voltage pulse signal), the second status (middle-voltage pulse signal), and the third status (low-voltage pulse signal), in the order of the second status, the third status, and the first status, or in the order of the third status, the first status, and the second status.

Alternatively, the rotation angle detection unit 106 detects that the direct-current motor rotates in a reverse direction when the pulse signals outputted from the signal processing unit 105 change in the order of the first status, the third status, and the second status, in the order of the third status, the second status, and the first status, or in the order of the second status, the first status, and the third status. The rotation angle detection unit 106 counts the number of times by which the pulse signals outputted from the signal processing unit 105 change to another status. The rotation angle detection unit 106 increases and decreases the count value according to the rotative direction. Specifically, for example, the rotation angle detection unit 106 increments the count value while the direct-current motor rotates in the normal direction or decrements the count value while the direct-current motor rotates in the reverse direction. Thereby, the rotation angle detection unit 106 detects the rotation angle of the direct-current motor. In the present structure, the rotation angle detection device (second related art) is capable of detecting the rotation angle of the direct-current motor for each 60-degree rotation. In addition, the rotation angle detection device (second related art) is capable of detecting the rotative direction of the direct-current motor.

PROBLEM IN RELATED ART

With regard to the rotation angle detection device (first related art), it is hard to detect the rotative direction of the direct-current motor accruing to change in amplitude state of an electric current. It is conceived to apply a direct-current motor as a driving source to an intake-air-control valve of an intake air control system for controlling intake air supplied into a combustion chamber of an internal combustion engine. In this example, a deceleration mechanism is used to reduce rotation speed of the direct-current motor by a rate of one-fortieth (1/40) and transmits the reduced torque to the intake-air-control valve. The rotation angle detection device (first related art) is capable of detecting the rotation angle of the direct-current motor for each 60-degree rotation or 120-degree rotation. Therefore, the rotation angle detection device (first related art) has a 3-degree resolution when detecting the rotation angle of the intake-air-control valve transmitted by the one-fortieth reduction rate. Accordingly, rotation angle detection device (first related art) has a coarse resolution in detection of the rotation angle.

Further, in the rotation angle detection devices (first and second related arts), the capacitor C1, C2 need to be soldered and fixed to the rotor member of the ring varistor 120 and the like. Therefore, when the direct-current motor rotates at a high speed, the capacitors C1, C2 may be detached. Accordingly, detection values obtained by the rotation angle detection devices are low in reliability. Further, in the rotation angle detection devices (first and second related arts), the capacitor C1, C2 need to be soldered and fixed to the rotor member of the ring varistor 120 and the like. Therefore, the rotation angle detection devices need a large number of components, large-scale manufacturing processes, and high manufacturing cost.

In consideration of the above-described subject, according to one aspect of the present invention, a direct-current motor control device comprises a direct-current motor. The direct-current motor includes a core equipped with three or more teeth arranged in a circumferential direction at a predetermined distance. The direct-current motor further includes an armature winding including three or more phase coils respectively wound around the three or more teeth. The direct-current motor further includes a commutator including three or more segments connected with the armature winding. The direct-current motor further includes at least one pair of brushes configured to supply an electric current through the armature winding to the commutator. The direct-current motor control device comprises further comprises a rotation angle detection device. The rotation angle detection device includes a direct-current power source configured to supply a direct current from one of the brushes through the commutator to the armature winding. The rotation angle detection device further includes an alternating-current power source configured to supply an alternating current from the one brush through the commutator to the armature winding. The rotation angle detection device further includes a current detection unit configured to detect an electric current flowing through the one brush to the direct-current motor, the electric current being caused by superimposing the direct current, which flows from the direct-current power source, on the alternating current, which flows from the alternating-current power source. The rotation angle detection device further includes an extracting unit configured to extract an alternating-current component from the electric current detected by the current detection unit. The rotation angle detection device further includes a rotation angle detection unit configured to detect a rotation angle of the direct-current motor according to the alternating-current component extracted by the extracting unit. The rotation angle detection device further includes a rotative direction detection unit configured to detect a rotative direction of the direct-current motor according to a change pattern of the alternating-current component extracted by the extracting unit. The core has three or more slots each defined between two of the teeth adjacent to each other in a circumferential direction of the core. The three or more slots respectively accommodate the three or more phase coils. Turns of the phase coils respectively accommodated in the slots of the core are different from each other.

According to another aspect of the present invention, a method for detecting a state of a direct-current motor, the direct-current motor includes a core equipped with three or more teeth arranged in a circumferential direction at a predetermined distance. The direct-current motor further includes an armature winding including three or more phase coils respectively wound around the three or more teeth. The direct-current motor further includes a commutator including three or more segments connected with the armature winding. The direct-current motor further includes at least one pair of brushes configured to supply an electric current to the commutator through the armature winding. The method comprises detecting an electric current flowing from one of the brushes through the commutator to the armature winding of the direct-current motor, the electric current caused by superimposing a direct current supplied from a direct-current power source on an alternating current supplied from the alternating-current power source. The method further comprises extracting an alternating-current component from the detected electric current. The method further comprises detecting a rotation angle of the direct-current motor according to the extracted alternating-current component. The method further comprises detecting a rotative direction of the direct-current motor according to a change pattern of the extracted alternating-current component. The core has three or more slots each defined between two of the teeth adjacent to each other in a circumferential direction of the core. The three or more slots respectively accommodate the three or more phase coils. Turns of the phase coils are different from each other such that an amplitude the extracted alternating-current component changes stepwise to cause the change pattern with rotation of the rotor of the direct-current motor.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

As follows, embodiments of the present invention will be described with reference to drawings. In the embodiments, the numbers of turns of phase coils accommodated in slots of a core of a direct-current motor are changed relative to each other slot by slot. Thereby, each of direct-current motor control devices according to the embodiments are capable of detecting the rotation angle and the rotative direction of a direct-current motor steadily with a reduced manufacturing cost, a reduced number of components, and a reduced manufacturing process.

First Embodiment

Configuration of First Embodiment

Figure 1A:
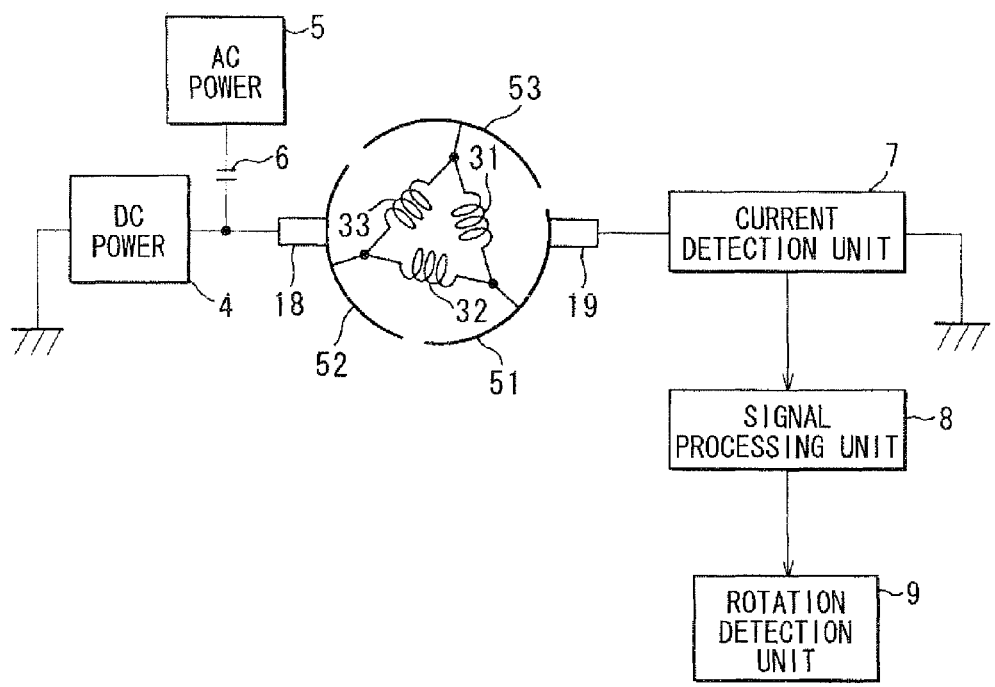
FIG. 1A is a block diagram showing a direct-current motor control device.
Figure 1B:
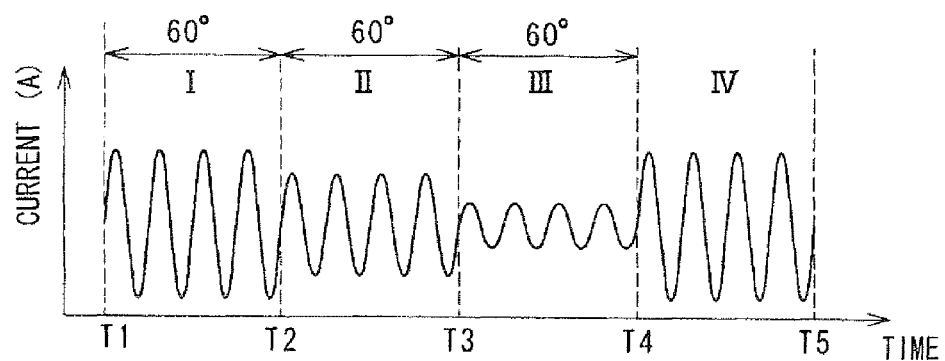
FIG. 1B is a timing chart showing an electric current waveform detected with the rotation angle detection device, according to a first embodiment.
Figure 2:
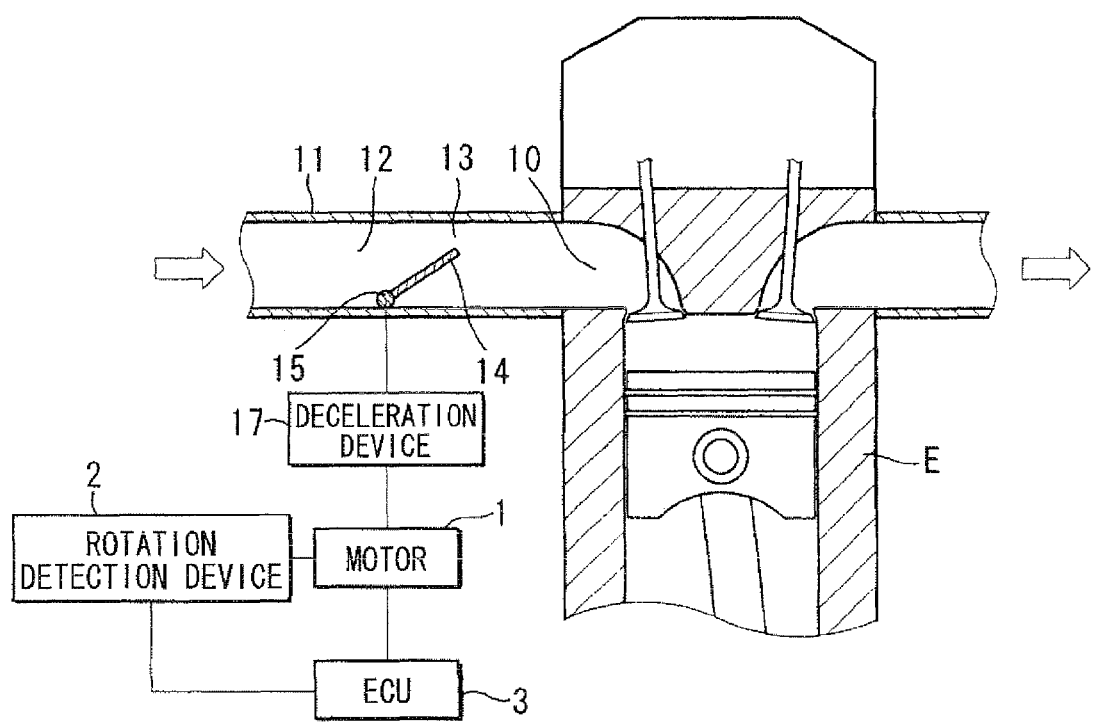
FIG. 2 is a schematic view showing an intake control device of an internal combustion engine according to the first embodiment.
Figure 3:
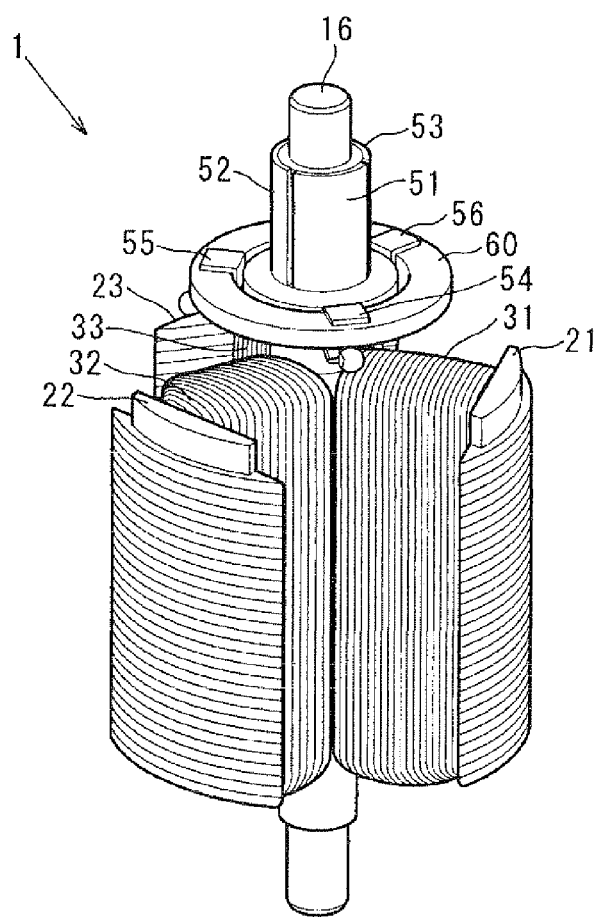
FIG. 3 is a perspective view showing a rotor of a two-pole three-slot (three-tooth) direct-current motor according to the first embodiment.
Figure 4:
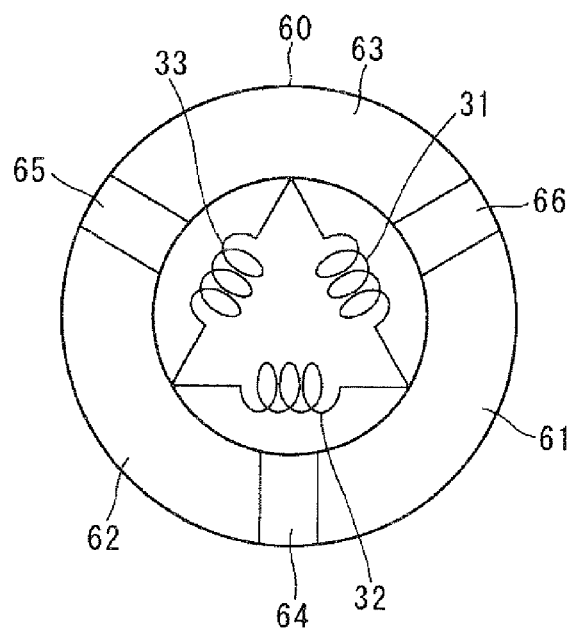
FIG. 4 is a schematic view showing a ring varistor of the direct-current motor according to the first embodiment.

FIG. 1A to FIG. 7 relate to the first embodiment of the present invention. FIGS. 1A, 1B are schematic views respectively showing a direct-current motor control device and a related time chart. FIG. 2 is a schematic view showing an intake control device of an internal combustion engine. FIG. 3 is perspective view showing a rotor of a two-pole (bipolar) three-slot (three-tooth) direct-current motor. FIG. 4 is a view showing a ring varistor of the direct-current motor.

The direct-current motor control device according to the present embodiment includes a two-pole three-slot (three-tooth) direct-current motor (brushed direct-current motor) 1 with a brush, a rotation angle detection device 2, and a direct-current motor control device (engine control device, engine-control unit: ECU) 3. The rotation angle detection device 2 detects the rotation angle and the rotative direction of the direct-current motor 1. The ECU 3 controls a direct-current electricity (electric current) supplied to the direct-current motor 1 according to the rotation angle and the rotative direction of the direct-current motor 1 detected with the rotation angle detection device 2. The rotation angle detection device 2 includes a direct-current power source 4, an alternating-current power source 5, a current detection unit 7, a signal processing unit 8, and a rotation angle detection portion 9. The direct-current power source 4 supplies direct-current electricity to the direct-current motor 1. The alternating-current power source 5 supplies alternating current to the direct-current motor 1. The current detection unit 7 detects an electric current supplied to the direct-current motor 1. The signal processing unit 8 includes an alternating-current component extracting unit (described later). The signal processing unit 8 generates a pulse signal corresponding to the amplitude of an alternating-current component extracted by the alternating-current component extracting unit. The rotation angle detection portion 9 detects the rotation angle and the rotative direction of the direct-current motor 1 according to the pulse signal outputted from the signal processing unit 8.

The direct-current motor control device is equipped in the intake control device for an internal combustion engine. The intake control device is configured to generate an air intake swirl flow for enhancing combustion of air-fuel mixture in a combustion chamber in each cylinder of the internal combustion engine (engine E). The intake control device is a system configured to cause an air intake swirl flow (tumble flow) in the vertical direction in the combustion chamber of each cylinder of the engine E. The intake control device is configured of the ECU 3, an air intake duct 11, and an intake-air-control valve (tumble-flow control valve: TCV). The ECU 3 controls the direct-current motor 1 according to an operation state (engine information) of the engine E. The air intake duct 11 is connected to each intake port 10 of the engine E. The intake-air-control valve causes a tumble flow in intake air, which flows through the air intake duct 11 (intake passage 12).

The TCV functions as an intake air flow control valve configured to throttle a passage sectional area of each intake passage 12 according to the operation state of the engine E thereby to control an intake air flow directed to the combustion chamber of each cylinder of the engine E. The TCV further functions as an intake air flow control valve configured to change an opening area of an air intake throttle portion 13 in each intake passage 12 according to the operation state of the engine E thereby to generate a gas flow or an air intake swirl flow in the combustion chamber of each cylinder of the engine E. The air intake throttle portion 13 is a passage formed between a wall surface of each intake passage and an upper end surface of a valve 14. The TCV includes the valve 14, a valve shaft 15, and an actuator. The valve 14 is a valve element of the intake-air-control valve rotatable relative to the air intake duct 11. The valve shaft 15 is a rotation axis supporting the valve 14. The actuator drives the valve 14 via the shaft 15.

The valve 14 is a rotary valve located in each intake passage 12 to open and close the intake passage 12. The valve 14 is rotatable relative to the air intake duct 11 with rotation of the shaft 15. The actuator includes the direct-current motor 1 and a power transmission mechanism (reduction gear mechanism, deceleration mechanism) 17. The direct-current motor 1 drives the shaft 15 of the valve 14. The power transmission mechanism 17 reduces the rotation speed of the motor shaft (rotation axis, shaft) 16 of the direct-current motor 1 at a predetermined reduction ratio such as 40 thereby to increase a driving force (motor torque) of the direct-current motor 1 and transmits the increased driving force to the shaft 15 of the valve 14. The reduction gear mechanism 17 is configured of a worm gear, a worm wheel, and the like. The worm gear is rotated by the shaft 16 of the direct-current motor 1. The worm wheel is meshed with the worm gear. The reduction gear mechanism may be configured of a first gear, which is rotated by the shaft 16 of the direct-current motor 1, a second gear, which is meshed with the first gear, and a third gear, which is meshed with the second gear.

Subsequently, the direct-current motor 1 according to the present embodiment will be described in detail with reference to FIG. 1 to FIG. 7. The direct-current motor 1 is, for example, a two-pole three-slot DC motor with a brush including three-phase armature winding which is formed in a manner of concentrated winding. The direct-current motor 1 includes a rotor (armature), a cylindrical stator, and a pair of electric supply brushes (first and second brushes) 18, 19. The rotor includes the shaft 16 extending straight in the axial direction. The stator surrounds the circumference of the rotor in the circumferential direction of the motor. The electric supply brushes 18, 19 are accommodated and held in a brush holder (not shown) fixed relative to the stator. The stator includes a tubular motor case (yoke), two permanent magnets (magnets M1, M2), and the like. As shown in FIG. 9, the two permanent magnets M1, M2 are adhered to the inner circumferential periphery of the motor case with an adhesive and located at positions opposed to each other. The two magnets M1, M2 generate two magnetic poles. A pair of brushes 18, 19 (first and second brushes) is located at 180-degree intervals in the circumferential direction of the motor to be opposed to each other. The first brush 18 is connected to a positive terminal side (Vcc side) of an external power source (direct-current power source) through an electric power supply line. The second brush 19 is connected to a negative terminal side (ground side, GND side) of the direct-current power source through an electric power supply line.

Figure 8:
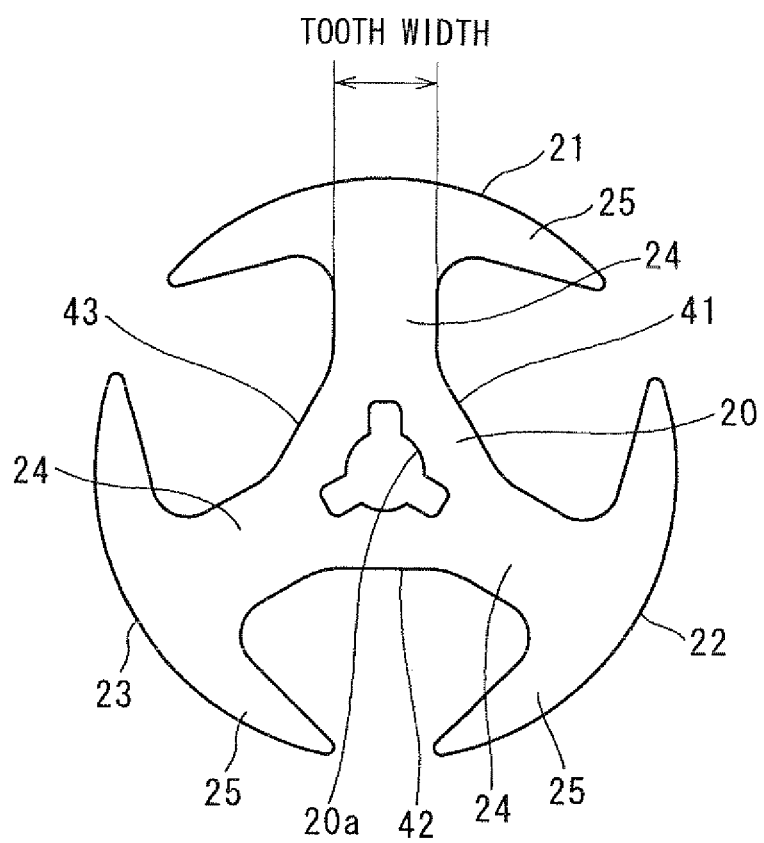
FIG. 8 is a plan view showing the form of magnetic steel plates according to a second embodiment.

The rotor is located at the radially inner side of the stator with a predetermined gap. The rotor includes the shaft 16, an armature core (rotor core), an armature winding (armature coil), and a commutator. The shaft 16 is supported by a motor case via a bearing and rotatable relative to the motor case. The armature core is formed by laminating multiple magnetic steel plates in the direction (axial direction) of the motor shaft. The armature winding is wound around the rotor core. The commutator is in contact with the pair of first and second brushes 18, 19, which is pressed toward the commutator. The rotor core is formed of a stacked iron core. The rotor core includes a fitted portion 20 and three salient poles (first to third teeth 21 to 23). As shown in FIG. 8, the fitted portion 20 is in a cylindrical shape or a rectangular pipe shape and press-fitted to the outer circumferential periphery of the shaft 16. The three pieces of the first to third teeth 21 to 23 are projected from the outermost periphery of the fitted portion 20.

The three pieces of first to third teeth 21 to 23 are provided to the circumference of the outermost periphery portion of the fitted portion 20 and located at regular intervals (120-degree intervals) in the circumferential direction. Each of the first to third teeth 21 to 23 has a tooth winding portion 24 and a tooth magnetic pole portion 25. The tooth winding portion 24 (FIG. 8) projects from the outermost periphery portion of the fitted portion 20 of the rotor core outward in the radial direction of the rotor. The tooth magnetic pole portion 25 (FIG. 8) is extending from the outer circumferential periphery end of the tooth winding portion 24 in the circumferential direction of the motor. The outer circumferential periphery of the tooth magnetic pole portion 25 is opposed to the inner circumferential periphery of the stator.

The shaft 16 is fixed to a through hole 20a, which extends through the center portion of the fitted portion 20. Both ends of the shaft 16 in the axial direction are supported by the motor case via a bearing to be rotatable relative to the motor case. In this way, the rotor is rotatable relative to the motor case and the stator. The first to third teeth 21 to 23, which are adjacent to each other in the circumferential direction of the rotor core, therebetween define first to third slots 41 to 43 respectively accommodating the first to third phase coils 31 to 33.

The armature winding includes first to third phase coils 31 to 33. Each of the first to third phase coils 31 to 33 is formed by winding a wire around the circumference of corresponding one tooth winding portion 24 of the three first to third teeth 21 to 23 in a manner of concentrated winding. The first to third phase coils 31 to 33 are respectively accommodated in the first to third slots 41 to 43. Each of the first to third phase coils 31 to 33 is wound on the outer side of corresponding one of the tooth winding portions 24 via an insulator. As shown in FIG. 1A and FIG. 4, the three-phase first to third teeth 21 to 23 of the armature winding are in delta connection.

In the direct-current motor 1 according to the present embodiment, the first to third coils 31 to 33 are respectively accommodated in the first to third slots 41 to 43 of the rotor core, and the number of turns of the first to third coils 31 to 33 are rendered different from each other for each of the first to third slots 41 to 43. Specifically, it is supposed that the number of turns of the first phase coil 31 wound around the circumference of the first tooth 21 is L1, the number of turns of the second phase coil 32 wound around the circumference of the second tooth 22 is L2, and the number of turns of the third phase coil 33 wound around the circumference of the third tooth 23 is L3. On the present premise, the numbers of turns of the first to third phase coils 31 to 33 are set to satisfy the relation of the following equation (1).

$$L1 \neq L2 \neq L3 \qquad (1)$$

More specifically, for example, the number of turns (L1) of the first phase coil 31 is 60 turns. The number of turns (L2) of the second phase coil 32 is 80 turns. The number of turns (L3) of the third phase coil 33 is 100 turns. In this way, the values of inductance of the first to third phase coils 31 to 33 become small in the order of the first phase coil 31, the second phase coil 32, and the third phase coil 33. In other words, the value of inductance becomes large as the number of turns increases. That is, the third phase coil 33, the second phase coil 32, and the first phase coil 31 have the large value of inductance in this order. The first to third phase coils 31 to 33 are located so that the phase coils 31 to 33 are separated from each other by an interval of ⅔π in electric angle.

In the direct-current motor 1, the first to third phase coils 31 to 33 of the armature winding are delta-connected, and the ends of the first to third phase coils 31 to 33 are respectively connected to the first to third segments (commutator pieces) 51 to 53 of the commutator. Specifically, the first phase coil 31 is connected between the third segments 53 and the first segments 51, the second phase coil 32 is connected between the first segments 51 and the second segments 52, and the third phase coil 33 is connected between the second segments 52 and the third segments 53. Two of the three pieces of the first to third segments 51 to 53 are respectively in contact with the first and second brushes 18, 19. Thus, two segments, which are in contact with the first and second brushes 18, 19, are switched with rotation of the commutator caused by rotation of the shaft 16 of the direct-current motor 1.

The commutator is fixed to the outer circumferential periphery of the shaft 16 via a tubular support cylinder 30 made of a synthetic resin. The commutator is configured of three pieces of the first to third segments 51 to 53, with which the pair of first and second brushes 18, 19 are in contact. In FIG. 3, an electric wiring, which connects the first to third phase coils 31 to 33 with the first to third segments 51 to 53 of the commutator, is omitted. The first to third segments 51 to 53 are respectively provided with contact pieces 54 to 56 in contact with first to third electrodes 61 to 63 of the ring varistor 60.

The ring varistor 60 is in a disc shape and equipped to a radially outer side of the commutator for flowing an electric current to the grand to restrain a noise when a surge voltage is applied. As shown in FIG. 4, the ring varistor 60 includes three pieces of the first to third electrodes 61 to 63 and resistive elements 64 to 66. The first to third electrodes 61 to 63 are electrically connected to the first to third segments 51 to 53 of the commutator. Each of the resistive elements 64 to 66 connects corresponding two of the first to third electrodes 61 to 63 adjacent to each other. An electric current is supplied from the direct-current power source 4 and the alternating-current power source 5 to the first and second brushes 18, 19, which are electrically connected to the first to third segments 51 to 53 of the commutator, through a pair of different-pole terminals (negative and positive pole terminals). Thereby, the electric current flows through the first to third phase coils 31 to 33 to rotate the rotor.

The ECU 3 supplies electricity to and control the actuator, in particular, the direct-current motor 1, which causes a driving force to drive the shaft 15 of the valve 14 on receiving supply of direct-current electricity. The ECU has a microcomputer including a CPU, a storage unit, an input circuit, an output circuit, a power supply circuit, a timer, and the like. The CPU executes control processings and arithmetic processings. The storage unit is a memory such as a ROM and a RAM that stores control programs and control logics. The ECU may be a generally known microcomputer.

The ECU 3 includes an operation state detection unit configured to detect an operation state of the engine E. The operation state of the engine E is detectable from an engine speed, an engine load (accelerator position), an engine cooling water temperature, an intake air temperature, and the like. The microcomputer of the ECU 3 is configured to receive an electric signal (sensor output signal), which is outputted from the rotation angle detection device 2 and ND converted by an A/D conversion device.

Subsequently, the rotation angle detection device 2 according to the present embodiment will be described with reference to FIG. 1 to FIG. 7. As shown in FIG. 1A, the rotation angle detection device 2 includes the direct-current power source 4, the alternating-current power source 5, a coupling capacitor 6, the current detection unit 7, the signal processing unit 8, and the rotation angle detection portion 9. The direct-current power source 4 generates a motor torque to rotate the shaft 16 of the direct-current motor 1. The alternating-current power source 5 generates an alternating current at a predetermined frequency for detecting the rotation angle of the shaft 16 of the direct-current motor 1. The coupling capacitor 6 superimposes an alternating current generated by the alternating-current power source 5 on a direct-current electricity supplied from the direct-current power source 4 to the direct-current motor 1. The current detection unit 7 detects an electric current flowing through the direct-current motor 1. The signal processing unit 8 converts the amplitude of the electric current detected by the current detection unit 7 into a pulse signal including different voltages. The rotation angle detection portion 9 detects the rotation angle and the rotative direction of the direct-current motor 1 according to the pulse signal outputted from the signal processing unit 8.

The electric current flowing through the direct-current motor 1, when the rotation angle and the rotative direction of the direct-current motor 1 are detected, is an AC/DC mixture electric current. The AC/DC mixture electric current is a kind of pulsation electricity in which the direct-current electricity from the direct-current power source 4 is superimposed on the alternating current from the alternating-current power source 5. The signal processing unit 8 includes the alternating-current component extracting unit which extracts an alternating-current component included in an electric current flowing through the direct-current motor 1. The rotation angle detection portion 9 includes the rotation angle detection unit and the rotative direction detection unit. The rotation angle detection unit detects the rotation angle of the direct-current motor 1 according to an alternating-current component extracted by the alternating-current component extracting unit. The rotative direction detection unit detects the rotative direction of the direct-current motor 1 according to a change pattern of an alternating-current component extracted by the alternating-current component extracting unit.

Detection Method of First Embodiment

Subsequently, a detection method according to the present embodiment will be described with reference to FIG. 1 to FIG. 7.

Each of FIGS. 5A to 7B shows a change in a wire connection state of the direct-current motor 1, i.e., change in the motor circuit formed between the first and second brushes 18, 19 in a period in which the rotor of the direct-current motor 1 rotates by 180 degrees. The state of the motor circuit of the direct-current motor 1 according to the present embodiment changes among three kinds including a state A, a state B, and a state C, while the rotor of the direct-current motor 1 rotates by 180 degrees. That is, three kinds of motor circuits, which respectively have different impedances, are formed at an interval of 60 degrees of rotation of the rotor. As shown in FIG. 1B, the current detection unit 7 detects values of pulsation electricity having different amplitudes while an electric current flows into each of the motor circuits.

Figure 5A:
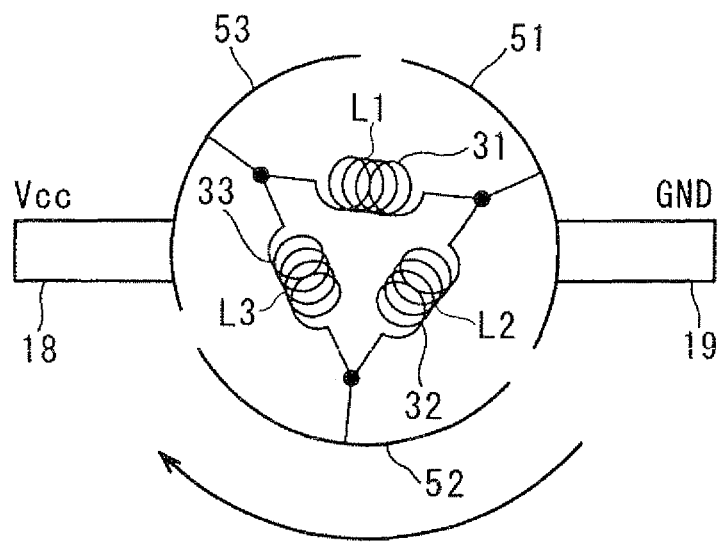
FIG. 5A is a schematic view showing a relationship between brushes and segments of the direct-current motor.
Figure 5B:
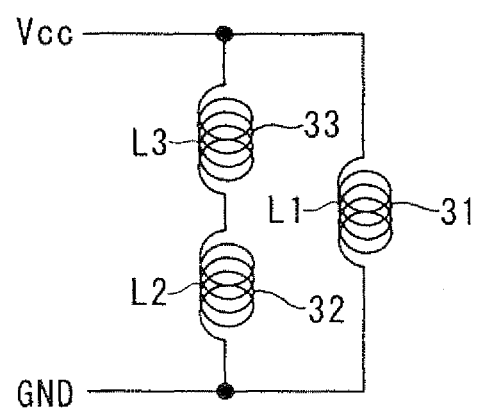
FIG. 5B is a schematic view showing a circuit formed in the state of FIG. 5A.

As shown in FIG. 5A, in the state A, the third segment 53 is in contact with the first brush 18 on the side of Vcc, i.e., on the side of the positive terminal of the direct-current power source 4, and the first segment 51 is in contact with the second brush 19 on the side of GND, i.e., on the side of the negative terminal of the direct-current power source 4. FIG. 5B shows an equivalent circuit of the direct-current motor 1 in the state A, i.e., the motor circuit formed between the first and second brushes 18, 19. The Vcc represents a power supply voltage of the direct-current power source 4. In the state A, the third phase coil 33 of 100 turns and the second phase coil 32 of 80 turns exist on one electric current path from the first brush 18 to the second brush 19. In addition, the first phase coil 31 of 60 turns exists on the other electric current path from the first brush 18 to the second brush 19. That is, in the state A, a series circuit including the third phase coil 33 and the second phase coil 32 and a circuit only including the first phase coil 31 exist. In this way, the impedance of the entire circuit becomes low. Thereby, an amplitude of the alternating-current component of the electric current, which flows through the motor circuit of the direct-current motor 1 becomes high. In the present condition, the current detection unit 7, which is configured to detect an electric current flowing through the motor circuit of the direct-current motor 1, detects a pulsation electricity in the first state. The pulsation electricity in the first state has a high amplitude of the alternating-current component, as shown by the time chart between the times T1 and T2 (T4 and T5) of FIG. 1B.

Figure 6A:
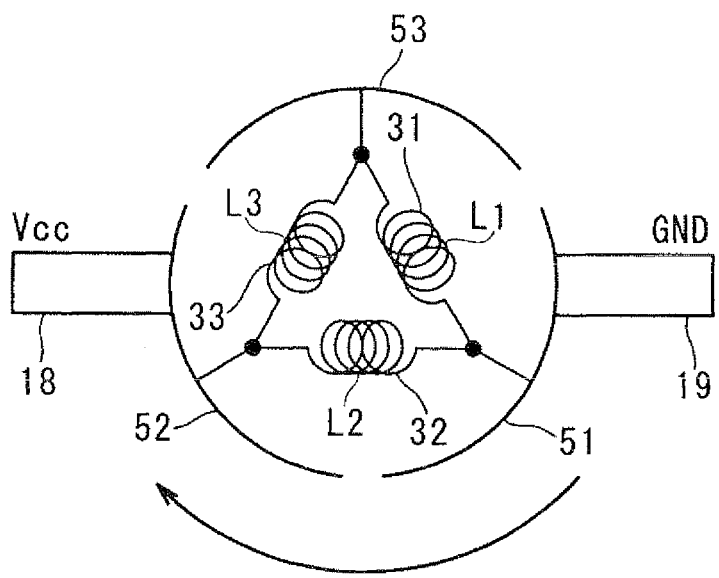
FIG. 6A is a schematic view showing a relationship between the brushes and the segments of the direct-current motor.
Figure 6B:
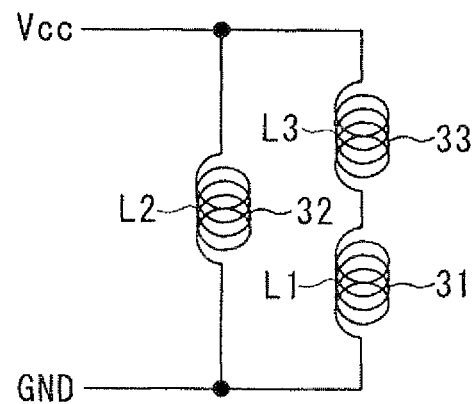
FIG. 6B is a schematic view showing a circuit formed in the state of FIG. 6A.

Subsequently, when the rotor of the direct-current motor 1 rotates by 60 degrees in a right rotative direction shown by the arrow, the rotor of the direct-current motor 1 is in the state B shown in FIG. 6A. In the state B, the second segment 52 is in contact with the first brush 18 on the side of Vcc, and the first segment 51 is in contact with the second brush 19 on the side of GND. FIG. 6B shows an equivalent circuit of the direct-current motor 1 in the state B, i.e., the motor circuit formed between the first and second brushes 18, 19. In the state B, the second phase coil 32 of 80 turns exists on one electric current path from the first brush 18 to the second brush 19. In addition, the third phase coil 33 of 100 turns and the first phase coil 31 of 60 turns exist on the other electric current path from the first brush 18 to the second brush 19. That is, in the state B, a circuit only including the second phase coil 32 and a series circuit including the third phase coil 33 and the first phase coil 31 exist. In this way, the impedance of the entire circuit becomes higher than the impedance in the state A. Thereby, an amplitude of the alternating-current component of the electric current, which flows through the motor circuit of the direct-current motor 1 becomes lower than the amplitude in the state A. In the present condition, the current detection unit 7, which is configured to detect an electric current flowing through the motor circuit of the direct-current motor 1, detects a pulsation electricity in the second state. The pulsation electricity in the second state has an amplitude of the alternating-current component shown by the time chart between the times T2 and T3 of FIG. 1B. The amplitude in the second state between the times T2 and T3 is lower than the amplitude in the first state between the times T1 and T2.

Figure 7A:
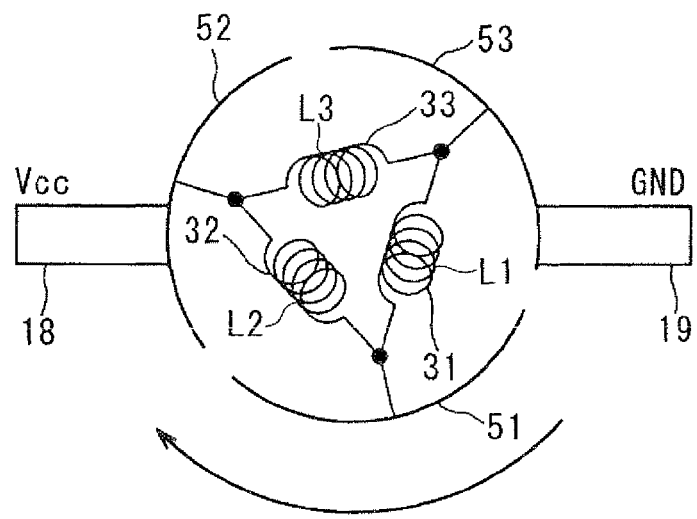
FIG. 7A is a schematic view showing a relationship between the brushes and the segments of the direct-current motor.
Figure 7B:
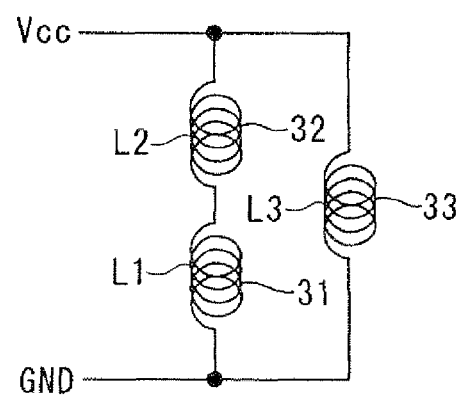
FIG. 7B is a schematic view showing a circuit formed in the state of FIG. 7A.

Subsequently, when the rotor of the direct-current motor 1 rotates by 60 degrees in the right rotative direction shown by the arrow, the rotor of the direct-current motor 1 is in the state C shown in FIG. 7A. In the state C, the second segment 52 is in contact with the first brush 18 on the side of Vcc, and the third segment 53 is in contact with the second brush 19 on the side of GND. FIG. 7B shows an equivalent circuit of the direct-current motor 1 in the state C, i.e., the motor circuit formed between the first and second brushes 18, 19. In the state C, the second phase coil 32 of 80 turns and the first phase coil 31 of 60 turns exist on one electric current path from the first brush 18 to the second brush 19. In addition, the third phase coil 33 of 100 turns exists on the other electric current path from the first brush 18 to the second brush 19. That is, in the state C, a series circuit including the second phase coil 32 and the first phase coil 31 and a circuit only including the third phase coil 33 exist. In this way, the impedance of the entire circuit becomes higher than the impedance in the state B. Thereby, an amplitude of the alternating-current component of the electric current, which flows through the motor circuit of the direct-current motor 1 becomes lower than the amplitude in the state B. In the present condition, the current detection unit 7, which is configured to detect an electric current flowing through the motor circuit of the direct-current motor 1, detects a pulsation electricity in the third state. The pulsation electricity in the third state has an amplitude of the alternating-current component shown by the time chart between the times T3 and T4 of FIG. 1B. The amplitude in the second state between the times T3 and T4 is lower than the amplitude in the second state between the times T2 and T3.

Thus, as shown in the FIG. 1B, the current detection unit 7 detects three kinds of pulsation electricity forms having different amplitudes in the first to third states altering at rotation interval of 60 degrees. Subsequently, the signal processing unit 8 converts the amplitude change in electric current detected by the current detection unit 7 into three kinds of pulse signals different in voltage by A/D conversion, rectification, smoothing, and the like. Specifically, when a pulsation electricity in the first state having a high amplitude of the alternating-current component is detected, the signal processing unit 8 outputs a pulse signal (X) of a highest voltage. When a pulsation electricity in the second state having a lower amplitude than the amplitude in the first state is detected, the signal processing unit 8 outputs a pulse signal (X) of a middle voltage. When a pulsation electricity in the third state having a lower amplitude than the amplitude in the second state is detected, the signal processing unit 8 outputs a pulse signal (X) of a lowest voltage.

As shown in the FIG. 1A, the signal processing unit 8 outputs a pulse signal to two circuits including first and second comparison circuits (not shown) of the rotation angle detection portion 9. The first comparison circuit compares the pulse signal (X) outputted from the signal processing unit 8 with a first threshold. When the pulse signal (X) outputted from the signal processing unit 8 is greater than or equal to the first threshold, the first comparison circuit outputs a signal representing 1. Alternatively, when the pulse signal (X) outputted from the signal processing unit 8 is less than the first threshold, the first comparison circuit outputs a signal representing 0. Simultaneously, the second comparison circuit compares the pulse signal (X) outputted from the signal processing unit 8 with a second threshold. When the pulse signal (X) outputted from the signal processing unit 8 is greater than or equal to the second threshold, the second comparison circuit outputs a signal representing 1. Alternatively, when the pulse signal (X) outputted from the signal processing unit 8 is less than the second threshold, the second comparison circuit outputs a signal representing 0.

When the output signal of the first comparison circuit represents 1 and when the output signal of the second comparison circuit represents 1, the rotation angle detection portion 9 determines that the pulse signal (X) outputted from the signal processing unit 8 is in a first status. When the output signal of the first comparison circuit represents 0 and when the output signal of the second comparison circuit represents 1, the rotation angle detection portion 9 determines that the pulse signal (X) outputted from the signal processing unit 8 is in a second status. When the output signal of the first comparison circuit represents 0 and when the output signal of the second comparison circuit represents 0, the rotation angle detection portion 9 determines that the pulse signal (X) outputted from the signal processing unit 8 is in a third status.

The rotation angle detection portion 9 detects that the rotor of the direct-current motor 1 rotates in a normal direction, i.e., in, for example, a closing direction of the valve 14 when the pulse signals (X) outputted from the signal processing unit 8 change in the order of the first status, the second status, and the third status, in the order of the second status, the third status, and the first status, or in the order of the third status, the first status, and the second status. Alternatively, the rotation angle detection portion 9 detects that the rotor of the direct-current motor 1 rotates in a reverse direction, i.e., in, for example, an opening direction of the valve 14 when the pulse signals (X) outputted from the signal processing unit 8 change in the order of the first status, the third status, and the second status, in the order of the third status, the second status, and the first status, or in the order of the second status, the first status, and the third status.

The rotation angle detection portion 9 counts the number of times by which the pulse signals (X) outputted from the signal processing unit 8 change to another status. Further, the rotation angle detection portion 9 increases and decreases the count value according to the rotative direction. More specifically, the rotation angle detection portion 9, for example, increments (adds) the count value when the rotor of the direct-current motor 1 rotates in the normal direction or decrements (subtracts) the count value when the rotor of the direct-current motor 1 rotates in the reverse direction. Thereby, the rotation angle detection portion 9 calculates the rotation angle of the rotor of the direct-current motor 1 or the rotation angle of the valve 14 of the TCV being a driven body.

Effect of First Embodiment

As described above, the first to third phase coils 31 to 33 are respectively accommodated in the first to third slots 41 to 43 of the rotor core of the direct-current motor 1. In addition, according to the present embodiment, the number of turns of the first to third phase coils 31 to 33 is changed for each of the first to third slots 41 to 43. Thereby, the rotation angle detection device 2 detects the rotation angle and the rotative direction of the rotor of the direct-current motor 1. More specifically, the number of turns (L1) of the first phase coil 31 wound around the circumference of the first tooth 21 is set at 60 turns. In addition, the number of turns (L2) of the second phase coil 32 wound around the circumference of the second tooth 22 is set at 80 turns. In addition, the number of turns (L3) of the third phase coil 33 wound around the circumference of the third tooth 23 is set at 100 turns.

The numbers of turns of the first to third phase coils 31 to 33 are changed correspondingly to the first to third slots 41 to 43 in this way. Thereby, the impedance changes stepwise with rotation of the rotor of the direct-current motor 1. Thus, the alternating-current component changes stepwise with stepwise change in the impedance. The current detection unit 7 detects an electric current (AC/DC mixture) which flows into the direct-current motor 1. The alternating-current component extracting unit of the signal processing unit 8 extracts the alternating-current component included in the detected electric current. Thus, the rotation angle detection portion 9 detects the rotation angle of the direct-current motor 1 according to the extracted alternating-current component.

In this way, detection of the rotative direction of the rotor of the direct-current motor 1 is enabled according to the stepwise change pattern of the alternating-current component extracted by the alternating-current component extracting unit. Thus, the rotation angle detection device 2 is enabled to detect the rotation angle of the rotor of the direct-current motor 1 and detect the rotative direction of the rotor of the direct-current motor 1. Furthermore, a detection result of the rotation angle of the direct-current motor 1 can also be corrected according to the detection result of the rotative direction of the direct-current motor 1. Therefore, even when the rotative direction of the direct-current motor 1 changes, the rotation angle can be detected accordingly with sufficient accuracy. Thus, the rotation angle and the rotative direction of the rotor of the direct-current motor can be detected steadily.

In addition, a rotor member such as the ring varistor 60 is not equipped with a capacitor. That is, a capacitor, which is to change the impedance stepwise with rotation of the rotor of the direct-current motor 1, need not be equipped. In the present structure, such a capacitor is not possibly detached from the rotor member. Therefore, reliability of the rotation angle and the rotative direction detected by the rotation angle detection device 2 can be enhanced. Furthermore, detection accuracy of the rotation angle and the rotative direction of the direct-current motor 1 can be enhanced without increase in the number of components and a manufacturing process. Therefore, manufacturing cost can be reduced.

The rotation angle detection device 2 according to the present embodiment is capable of detecting the rotation angle of the direct-current motor 1 at an interval of 60 degrees. The rotation angle of the valve 14 of the TCV is transmitted at the reduction ratio of 40. Therefore, the rotation angle detection device 2 has a 1.5-degree resolution about the rotation angle of the valve 14. According to the present structure, the resolution can be doubled compared with a rotation angle detection device according to the first related art. Furthermore, the ECU 3 is capable of supplying a driving current to the direct-current motor 1 according to the detection result of the rotation angle of the detection device 2 such that the valve 14 of the TCV rotates in a target rotative direction to a target rotation angle.

Second Embodiment

FIG. 8 shows a two-pole three-slot (three-tooth) rotor core of a direct-current motor according to the present second embodiment.

When the number of turns of the first to third phase coils 31 to 33 in the first to third slots 41 to 43 are rendered different from each other, the weight of the first to third phase coils 31 to 33 become different from each other. Consequently, weight of the direct-current motor may be unbalanced. In order to solve the present problem of weight unbalance, it is conceived to render the shapes of the magnetic steel plates of the rotor core of the direct-current motor 1 different from each other in consideration of the difference in weight of the first to third phase coils 31 to 33. Specifically, the widths (tooth widths) of the tooth winding portions 24 of the first to third teeth 21 to 23 may be rendered different from each other in consideration of the difference in weight of the first to third phase coils 31 to 33.

For example, as the number of turns of one of the first to third phase coils 31 to 33 becomes large, the tooth widths of the corresponding one of the tooth winding portions 24 of the first to third teeth 21 to 23 may be reduced. Thereby, weight of each of the first to third phase coils 31 to 33 may be controlled to solve the unbalance structure of the rotor of the direct-current motor 1. In this way, a magnitude of unbalance of the rotor of the direct-current motor 1 can be reduced. Therefore, defect such as oscillation resulting in short life of a bearing member and noise can be solved.

Third Embodiment

Figure 9A:
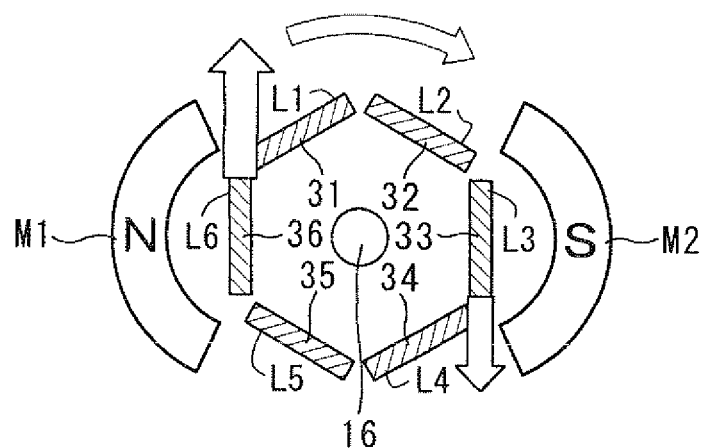
FIGS. 9A, 9B are views each showing a two-pole six-slot (six-tooth) direct-current motor according to the third embodiment.
Figure 9B:
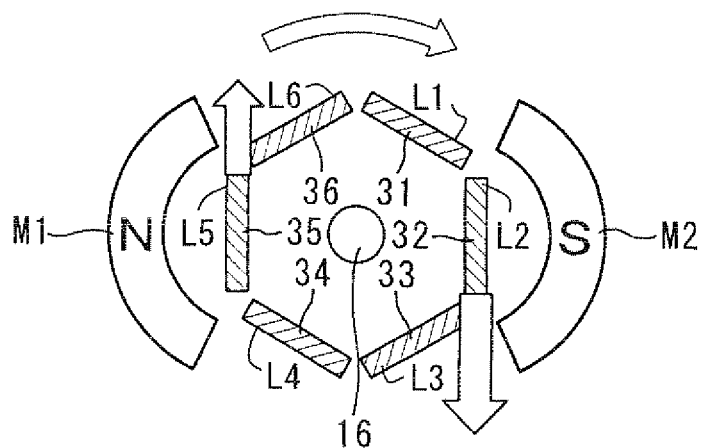
Figure 10A:
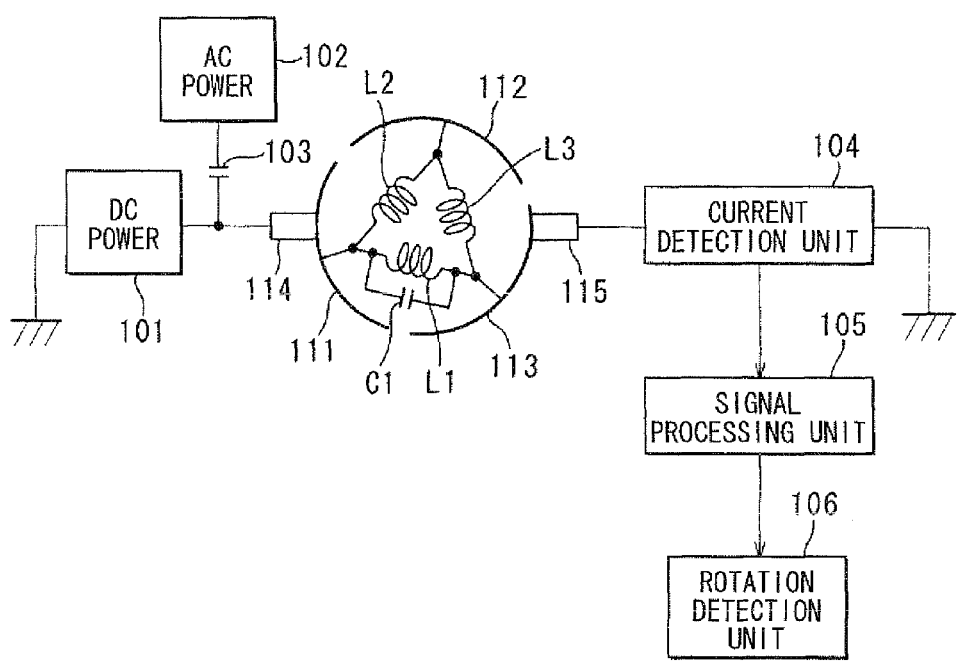
FIG. 10A is a block diagram showing a rotation angle detection device.
Figure 10B:
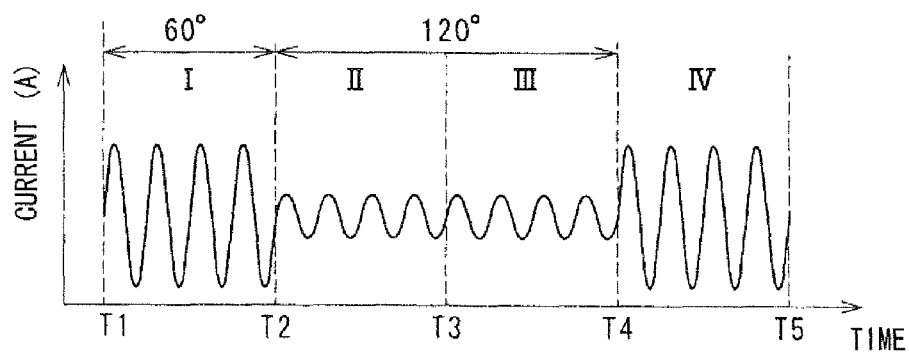
FIG. 10B is a timing chart showing an electric current waveform detected with the rotation angle detection device, according to a first related art.
Figure 11A:
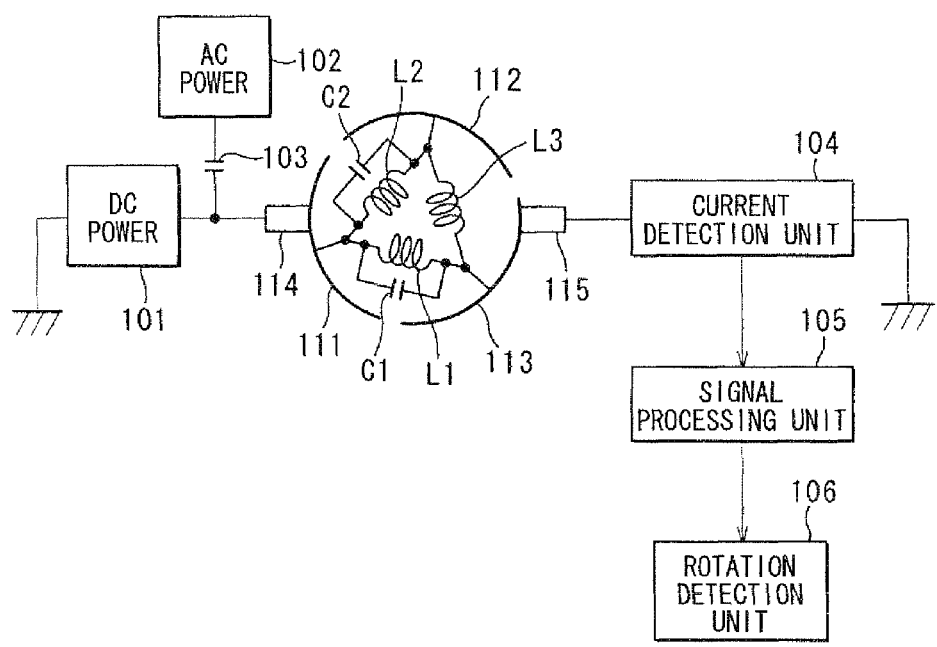
FIG. 11A is a block diagram showing a rotation angle detection device.
Figure 11B:
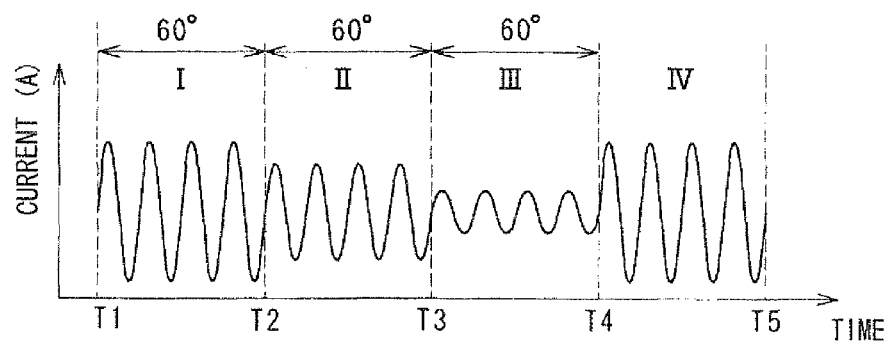
FIG. 11B is a timing chart showing an electric current waveform detected with the rotation angle detection device, according to a second related art.
Figure 12A:
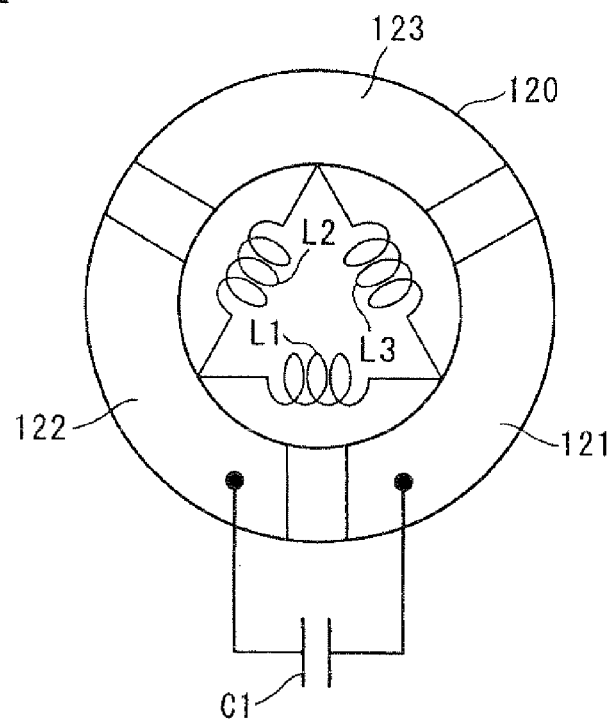
FIG. 12A is a schematic plan view showing a capacitor mounted on a ring varistor of a direct-current motor according to the first related art.
Figure 12B:
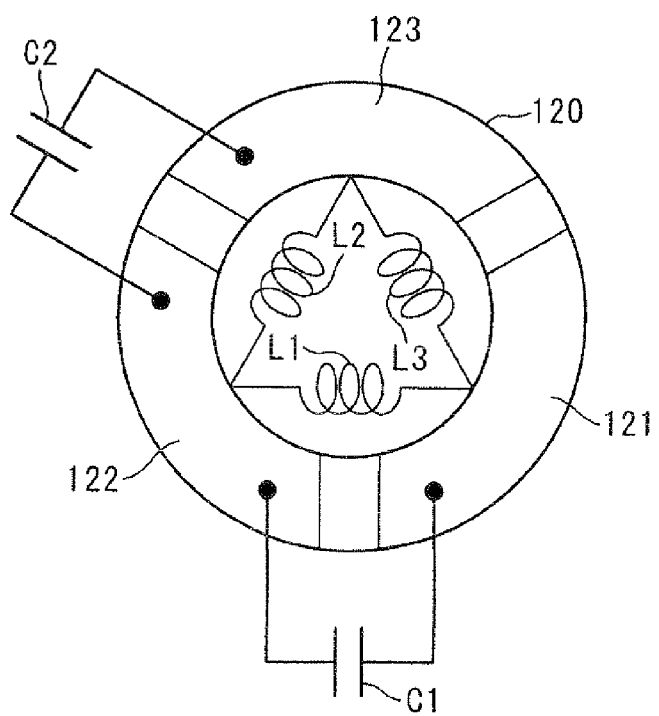
FIG. 12B is a schematic plan view showing capacitors mounted on a ring varistor of a direct-current motor according to the second related art.

FIGS. 9A, 9B show a two-pole six-slot (six-tooth) direct-current motor according to the present third embodiment.

The direct-current motor control device according to the present embodiment includes a two-pole six-slot (six-tooth) direct-current motor 1 with a brush, a rotation angle detection device 2, and the ECU 3. The rotation angle detection device 2 detects the rotation angle and the rotative direction of the direct-current motor 1. The ECU 3 controls a direct-current electricity (electric current) supplied to the direct-current motor 1 according to the rotation angle and the rotative direction of the direct-current motor 1 detected with the rotation angle detection device 2. The rotor core is a stacked iron core formed of laminated multiple magnetic steel plates. The rotor core includes six salient poles (first to sixth teeth) each projecting radially outward from the outermost periphery portion of the fitted portion 20, which is fitted to the outer circumferential periphery of the shaft 16.

The six pieces of first to sixth teeth are provided to the circumference of the outermost periphery portion of the fitted portion 20 and located at regular intervals (60-degree intervals) in the circumferential direction. Each of the six pieces of first to sixth teeth includes the tooth winding portion 24 (refer to FIG. 8) and the tooth magnetic pole portion 25 (refer to FIG. 8). The first to sixth teeth 31 to 36, which are adjacent to each other in the circumferential direction of the rotor core, therebetween define first to sixth slots respectively accommodating the first to sixth phase coils 31 to 36. The armature winding includes the first to sixth phase coils 31 to 36 respectively wound around the tooth winding portions 24 of the six pieces of the first to sixth teeth 31 to 36.

It is supposed that the number of turns of the first phase coil 31 wound around the circumference of the first tooth is L1, the number of turns of the second phase coil 32 wound around the circumference of the second tooth is L2, and the number of turns of the third phase coil wound around the circumference of the third tooth is L3. In addition, it is supposed that the number of turns of the fourth phase coil 34 wound around the circumference of the fourth tooth is L4, the number of turns of the fifth phase coil 35 wound around the circumference of the fifth tooth is L5, and the number of turns of the sixth phase coil 36 wound around the circumference of the sixth tooth is L6. On the present premise, the numbers of turns of the first to sixth phase coils 31 to 36 are set to satisfy the relations of the following equations (2), (3).

$$L1+L4=L2+L5=L3+L6 \quad (2)$$

$$L1 \neq L2 \neq L3 \neq L4 \neq L5 \neq L6 \quad (3)$$

More specifically, for example, the number of turns (L1) of the first phase coil 31 is 60 turns, and the number of turns (L4) of the fourth phase coil 34, which is opposed to the first phase coil 31, is 170 turns. In addition, the number of turns (L2) of the second phase coil 32 is 80 turns, and the number of turns (L5) of the fifth phase coil 35, which is opposed to the second phase coil 32, is 150 turns. In addition, the number of turns (L3) of the third phase coil 33 is 100 turns, and the number of turns (L6) of the sixth phase coil 36, which is opposed to the third phase coil 33, is 130 turns.

In the present structure, the numbers of turns of the first to sixth phase coils 31 to 36 are different from each other. Consequently, torque fluctuation may arise in the direct-current motor 1. In consideration of this, as shown in FIG. 9, the number of the slots may be set at an even number such as six to have six pieces of the first to sixth slots. In this case, the sum of the numbers of turns of the first phase coil 31 and the fourth phase coil 34, the sum of the numbers of turns of the second phase coil 32 and the fifth phase coil 35, and the sum of the numbers of turns of the third phase coil 33 and the sixth phase coil 36, may be set at the same number. Thereby, torque fluctuation of the direct-current motor 1 can be decreased. In this way, the ratio of the numbers of turns of the first to sixth coils 31 to 36 may be set such that torque fluctuation and a magnitude of unbalance of rotation moment can be reduced sufficiently. It is noted that the ratio of the numbers of turns of the first to sixth coils 31 to 36 may be set in a certain range such that impedance may change to enable detection of change in amplitude of the alternating-current component.

(Modification)

In the embodiments, the number of the magnetic poles of the rotor of the direct-current motor 1 is set at three or six, and the number of the magnetic poles of the stator is set at two. That is, the number of the magnetic poles of the rotor is set to be greater than the number of magnetic poles of the stator. It is noted that, for example, the number of the magnetic poles of the rotor of the direct-current motor 1 may be set at four, and the number of the magnetic poles of the stator may be set at eight. In such a way, the number of the magnetic poles of the rotor may be set to be less than the number of the magnetic poles of the stator.

In the embodiments, the direct-current motor 1 is used as a power source of the valve 14 for controlling a tumble flow. It is noted that, the direct-current motor 1 may be used as a power source of another valve such as a valve for controlling a flow, a valve for switching passages, a valve for opening and closing a passage, or the like. The direct-current motor 1 may be coupled with the shaft 15 of the valve 14.

Summarizing the above embodiments, a direct-current motor includes: a core equipped with three or more teeth arranged in a circumferential direction at a predetermined distance; an armature winding including phase coils having three or more phases respectively wound around three or more teeth; a commutator including three or more segments connected with the armature winding; and at least one pair of brushes configured to supply an electric current to the commutator through the armature winding. The core has three or more slots each defined between teeth adjacent to each other in the circumferential direction for accommodating a phase coil. In the direct-current motor, the numbers turns of the phase coils accommodated in the slots of the core are differentiated from each other in a slot-by-slot manner. A current detection unit detects an electric current (AC/DC mixture) which flows into the direct-current motor. An alternating-current component extracting unit extracts an alternating-current component included in the detected electric current.

The rotation angle detection unit detects a rotation angle of the direct-current motor according to the extracted alternating-current component.

The numbers of turns of the phase coils respectively accommodated in the slots of the core of the direct-current motor are rendered different from each other. Thereby, stepwise change in impedance arises with rotation of the direct-current motor. Thus, the alternating-current component changes stepwise with the stepwise change in the impedance. More specifically, when an electric current flows into a phase coil having a large number of turns, impedance becomes large. In this way, the amplitude of the alternating-current component extracted by the alternating-current component extracting unit becomes small. Alternatively, when an electric current flows into a phase coil having a small number of turns, impedance becomes small. In this way, the amplitude of the alternating-current component extracted by the alternating-current component extracting unit becomes large. According to the present structure, the rotation angle of the direct-current motor can be detected according to change in the amplitude of the alternating-current component. In addition, the rotative direction of the direct-current motor can be detected from a stepwise change pattern of the alternating-current component extracted by the alternating-current component extracting unit. Therefore, the rotation angle detection device is enabled to detect the rotation angle and detect the rotative direction. Thus, the rotation angle and the rotative direction of the direct-current motor can be detected steadily.

The direct-current motor may include a rotor, which includes a shaft extending in an axial direction, and a tubular stator, which surrounds a circumference of the rotor in the circumferential direction. The rotor of the direct-current motor may be equipped with the core, the armature winding, the commutator, and the brush. The stator of the direct-current motor may have at least two magnetic poles. Each of the teeth may be equipped with a tooth winding portion, which projects from an outer circumferential periphery of the core outward in a radial direction of the rotor, and a tooth magnetic pole portion, which extends from an outer circumferential periphery end of the tooth winding portion toward both sides in the circumferential direction. Each of the phase coils may be wound by a predetermined number of turns to surround a circumference of the tooth winding portion of the tooth.

In the three or more teeth, widths of the tooth winding portions may be rendered different from each other in consideration of a difference in weight of the phase coils. When the numbers of turns of the phase coils are simply rendered different from each other in the slots, difference in weight of phase coils may cause weight unbalance. Accordingly, the widths of the tooth winding portions may be rendered different from each other in consideration of difference in weight of the phase coils. For example, the width of the tooth winding portion may be decreased, as the number of turns of the phase coil becomes large. Thereby, the weight of each phase coil can be controlled. Thus, a magnitude of unbalance of the rotor can be reduced. In this way, a magnitude of unbalance of the rotor can be reduced. Therefore, defect such as oscillation resulting in short life of a bearing member and noise can be solved.

The three or more teeth may include six pieces of first to sixth teeth arranged in the circumferential direction of the rotor at an interval of 60 degrees. The armature winding may include first to sixth phase coils respectively wound around the six pieces of the first to sixth teeth. It is supposed that the number of turns of the first phase coil wound around the circumference of the first tooth is $L1$, the number of turns of the second phase coil wound around the circumference of the second tooth is $L2$, and the number of turns of the third phase coil wound around the circumference of the third tooth is $L3$. In addition, it is supposed that the number of turns of the fourth phase coil wound around the circumference of the fourth tooth is $L4$, the number of turns of the fifth phase coil wound around the circumference of the fifth tooth is $L5$, and the number of turns of the sixth phase coil wound around the circumference of the sixth tooth is $L6$. On the present premise, the numbers of turns of the first to sixth phase coils are set to satisfy the relations of the following equations of $L1+L4=L2+L5=L3+L6$ and $L1 \neq L2 \neq L3 \neq L4 \neq L5 \neq L6$.

According to the present structure, the numbers of turns of phase coils are different from each other. Consequently, torque fluctuation may arise in the direct-current motor. In consideration of this, the number of the slots may be set at an even number. In addition, all the sums of the numbers of turns of phase coils, which are opposed to each other, may be set at the same number. Thereby, torque fluctuation in the direct-current motor can be decreased. On the present premise, the numbers of turns of the first to sixth phase coils may be set to satisfy the relations of the following equations of $L1+L4=L2+L5=L3+L6$ and $L1 \neq L2 \neq L3 \neq L4 \neq L5 \neq L6$. In this way, the ratio of the numbers of turns of the coils can be set such that torque fluctuation and unbalance of rotation moment can be reduced sufficiently. It is considered that the ratio of the numbers of turns of the coils is set in a certain range such that impedance may change to enable detection of change in amplitude of the alternating-current component.

The core of the direct-current motor may be formed of multiple magnetic steel plates fitted to an outer circumferential periphery of the shaft and stacked in an axial direction of the shaft. The direct-current motor control device may further include a fluid control valve configured to control fluid flowing through a fluid passage and a deceleration mechanism configured to transmit a rotation torque of the direct-current motor to the fluid control valve and decelerate a rotation speed of the direct-current motor at a predetermined deceleration ratio. In the present structure, the rotation angle detection device is capable of detecting a rotation angle of the fluid control valve and detecting a rotative direction of the fluid control valve.

The equation of $L1 \neq L2 \neq L3 \neq L4 \neq L5 \neq L6$ may represent that $L1$ is not equal to any one of $L2$, $L3$, $L4$, $L5$, and $L6$; $L2$ is not equal to any one of $L1$, $L3$, $L4$, $L5$, and $L6$; $L3$ is not equal to any one of $L1$, $L2$, $L4$, $L5$, and $L6$; $L4$ is not equal to any one of $L1$, $L2$, $L3$, $L5$, and $L6$; $L5$ is not equal to any one of $L1$, $L2$, $L3$, $L4$, and $L6$; and $L6$ is not equal to any one of $L1$, $L2$, $L3$, $L4$, and $L5$.

The above structures of the embodiments can be combined as appropriate.

The above processings such as calculations and determinations are not limited being executed by the ECU 3. The control unit may have various structures including the ECU 3 shown as an example.

The above processings such as calculations and determinations may be performed by any one or any combinations of software, an electric circuit, a mechanical device, and the like. The software may be stored in a storage medium, and may be transmitted via a transmission device such as a network device. The electric circuit may be an integrated circuit, and may be a discrete circuit such as a hardware logic configured with electric or electronic elements or the like. The elements producing the above processings may be discrete elements and may be partially or entirely integrated.

It should be appreciated that while the processes of the embodiments of the present invention have been described herein as including a specific sequence of steps, further alternative embodiments including various other sequences of these steps and/or additional steps not disclosed herein are intended to be within the steps of the present invention.

Various modifications and alternations may be diversely made to the above embodiments without departing from the spirit of the present invention.

What is claimed is:

1. A direct-current motor control device comprising:
a direct-current motor including:
a core equipped with three or more teeth arranged in a circumferential direction at a predetermined distance;
an armature winding including three or more phase coils respectively wound around the three or more teeth;
a commutator including three or more segments connected with the armature winding; and
at least one pair of brushes configured to supply an electric current through the armature winding to the commutator; and
a rotation angle detection device including:
a direct-current power source configured to supply a direct current from one of the brushes through the commutator to the armature winding;
an alternating-current power source configured to supply an alternating current from the one brush through the commutator to the armature winding;
a current detection unit configured to detect an electric current flowing through the one brush to the direct-current motor, the electric current being caused by superimposing the direct current, which flows from the direct-current power source, on the alternating current, which flows from the alternating-current power source;
an extracting unit configured to extract an alternating-current component from the electric current detected by the current detection unit;
a rotation angle detection unit configured to detect a rotation angle of the direct-current motor according to the alternating-current component extracted by the extracting unit; and
a rotative direction detection unit configured to detect a rotative direction of the direct-current motor according to a change pattern of the alternating-current component extracted by the extracting unit, wherein
the core has three or more slots each defined between two of the teeth adjacent to each other in a circumferential direction of the core,
the three or more slots respectively accommodate the three or more phase coils, and
turns of the phase coils respectively accommodated in the slots of the core are different from each other, wherein
the direct-current motor further includes:
a rotor including a shaft extending in an axial direction; and
a tubular stator surrounding a circumference of the rotor in a circumferential direction,
the rotor further includes the core, the armature winding, the commutator, and the brushes,
the stator has at least two magnetic poles,
each of the teeth is equipped with:
a tooth winding portion projecting from an outer circumferential periphery of the core outward in a radial direction of the rotor; and
a tooth magnetic pole portion extending from an outer circumferential periphery end of the tooth winding portion toward both sides in the circumferential direction,
each of the phase coils is wound by a predetermined turns to surround a circumference of corresponding one tooth winding portion of the tooth, and
widths of the tooth winding portions of the three or more teeth are different from each other in consideration of a difference in weight of the phase coils.

2. The direct-current motor control device according to claim 1, wherein
the three or more teeth include first to sixth teeth arranged in the circumferential direction of the rotor at 60-degree intervals,
the armature winding includes first to sixth phase coils respectively wound around the first to sixth teeth,
turns of the first phase coil wound around a circumference of the first tooth is L1,
turns of the second phase coil wound around a circumference of the second tooth is L2,
turns of the third phase coil wound around a circumference of the third tooth is L3,
turns of the fourth phase coil wound around a circumference of the fourth tooth and opposed to the first phase coil is L4,
turns of the fifth phase coil wound around a circumference of the fifth tooth and opposed to the second phase coil is L5,
turns of the sixth phase coil wound around a circumference of the sixth tooth and opposed to the third phase coil is L6, and
the turns of the first to sixth phase coils are set to satisfy the relations of the following equations:

$$L1+L4=L2+L5=L3+L6; \text{ and}$$

$$L1 \neq L2 \neq L3 \neq L4 \neq L5 \neq L6.$$

3. A direct-current motor control device comprising:
a direct-current motor including:
a core equipped with three or more teeth arranged in a circumferential direction at a predetermined distance;
an armature winding including three or more phase coils respectively wound around the three or more teeth;
a commutator including three or more segments connected with the armature winding; and
at least one pair of brushes configured to supply an electric current through the armature winding to the commutator; and
a rotation angle detection device including:
a direct-current power source configured to supply a direct current from one of the brushes through the commutator to the armature winding;
an alternating-current power source configured to supply an alternating current from the one brush through the commutator to the armature winding;
a current detection unit configured to detect an electric current flowing through the one brush to the direct-current motor, the electric current being caused by superimposing the direct current, which flows from the direct-current power source, on the alternating current, which flows from the alternating-current power source;
an extracting unit configured to extract an alternating-current component from the electric current detected by the current detection unit;
a rotation angle detection unit configured to detect a rotation angle of the direct-current motor according to the alternating-current component extracted by the extracting unit; and
a rotative direction detection unit configured to detect a rotative direction of the direct-current motor according to a change pattern of the alternating-current component extracted by the extracting unit, wherein the core has three or more slots each defined between two of the teeth adjacent to each other in a circumferential direction of the core, the three or more slots respectively accommodate the three or more phase coils, and turns of the phase coils respectively accommodated in the slots of the core are different from each other, wherein the direct-current motor further includes:

a rotor including a shaft extending in an axial direction; and a tubular stator surrounding a circumference of the rotor in a circumferential direction, the rotor further includes the core, the armature winding, the commutator, and the brushes, the stator has at least two magnetic poles, the three or more teeth include first to sixth teeth arranged in the circumferential direction of the rotor at 60-degree intervals, the armature winding includes first to sixth phase coils respectively wound around the first to sixth teeth, turns of the first phase coil wound around a circumference of the first tooth is L1, turns of the second phase coil wound around a circumference of the second tooth is L2, turns of the third phase coil wound around a circumference of the third tooth is L3, turns of the fourth phase coil wound around a circumference of the fourth tooth and opposed to the first phase coil is L4, turns of the fifth phase coil wound around a circumference of the fifth tooth and opposed to the second phase coil is L5, turns of the sixth phase coil wound around a circumference of the sixth tooth and opposed to the third phase coil is L6, and the turns of the first to sixth phase coils are set to satisfy the relations of the following equations:

$L1+L4=L2+L5=L3+L6$; and $L1 \neq L2 \neq L3 \neq L4 \neq L5 \neq L6$.

4. The direct-current motor control device according to claim 3, wherein each of the teeth is equipped with:

a tooth winding portion projecting from an outer circumferential periphery of the core outward in a radial direction of the rotor; and a tooth magnetic pole portion extending from an outer circumferential periphery end of the tooth winding portion toward both sides in the circumferential direction, and each of the phase coils is wound by a predetermined turns to surround a circumference of corresponding one tooth winding portion of the tooth.

5. The direct-current motor control device according to claim 4, wherein widths of the tooth winding portions of the three or more teeth are different from each other in consideration of a difference in weight of the phase coils.

6. The direct-current motor control device according to claim 1, wherein the core of the direct-current motor is formed of a plurality of magnetic steel plates stacked in an axial direction of the shaft and fitted to an outer circumferential periphery of the shaft.

7. The direct-current motor control device according to claim 1, further comprising:

a fluid control valve configured to control fluid flowing through a fluid passage; and a deceleration mechanism configured to decelerate a rotation speed of the direct-current motor at a predetermined deceleration ratio and transmit a torque of the direct-current motor to the fluid control valve.

8. The direct-current motor control device according to claim 3, wherein the core of the direct-current motor is formed of a plurality of magnetic steel plates stacked in an axial direction of the shaft and fitted to an outer circumferential periphery of the shaft.

9. The direct-current motor control device according to claim 3, further comprising:

a fluid control valve configured to control fluid flowing through a fluid passage; and a deceleration mechanism configured to decelerate a rotation speed of the direct-current motor at a predetermined deceleration ratio and transmit a torque of the direct-current motor to the fluid control valve.

* * * * *